(12) United States Patent
Takahashi et al.

(10) Patent No.: US 9,438,391 B2
(45) Date of Patent: Sep. 6, 2016

(54) MOBILE COMMUNICATION METHOD, RADIO BASE STATION, AND MOBILE STATION

(71) Applicant: NTT DOCOMO, INC., Tokyo (JP)

(72) Inventors: Hideaki Takahashi, Tokyo (JP); Wuri Andarmawanti Hapsari, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/349,114

(22) PCT Filed: Oct. 1, 2012

(86) PCT No.: PCT/JP2012/075388
§ 371 (c)(1),
(2) Date: Apr. 2, 2014

(87) PCT Pub. No.: WO2013/051508
PCT Pub. Date: Apr. 11, 2013

(65) Prior Publication Data
US 2014/0248893 A1    Sep. 4, 2014

(30) Foreign Application Priority Data

Oct. 3, 2011 (JP) ................................. 2011-219652

(51) Int. Cl.
*H04Q 7/20* (2006.01)
*H04L 5/00* (2006.01)
(Continued)

(52) U.S. Cl.
CPC ............. *H04L 5/0035* (2013.01); *H04B 7/024* (2013.01); *H04L 1/0026* (2013.01); *H04W 24/08* (2013.01); *H04B 7/0626* (2013.01); *H04L 5/0091* (2013.01); *H04L 2001/0092* (2013.01); *H04W 48/12* (2013.01); *H04W 76/064* (2013.01)

(58) Field of Classification Search
CPC ............................... H04W 36/00; H04W 4/06
See application file for complete search history.

(56) References Cited

U.S. PATENT DOCUMENTS

| | | |
|---|---|---|
| 8,774,037 B2 * | 7/2014 | Kim et al. .................... 370/252 |
| 2011/0199986 A1 * | 8/2011 | Fong et al. ................... 370/329 |

(Continued)

FOREIGN PATENT DOCUMENTS

WO    2011-050727 A1    5/2011

OTHER PUBLICATIONS

International Search Report issued in PCT/JP2012/075388 mailed on Nov. 6, 2012 (3 pages).
(Continued)

*Primary Examiner* — Charles Appiah
*Assistant Examiner* — Randy Peaches
(74) *Attorney, Agent, or Firm* — Osha Liang LLP (57) ABSTRACT

The addition and change of a CoMP transmission point performing a CoMP transmission/reception process is appropriately performed. A mobile communication method includes: a step of notifying, by a radio base station (eNB), configuration information of CSI-RS of a CoMP transmission point to a mobile station (UE) connected to a cell (#5) managed by the radio base station (eNB), when instructing an addition or change of the CoMP transmission point performing a CoMP transmission/reception process by "RRC Connection Reconfiguration"; a step of measuring, by the mobile station (UE), a CQI of the CoMP transmission point by using the CSI-RS of the CoMP transmission point, while performing the CoMP transmission/reception process; and a step of notifying, by the mobile station (UE), the CQI of the CoMP transmission point to the radio base station (eNB).

3 Claims, 9 Drawing Sheets (51) Int. Cl.
| | | |
|---|---|---|
| *H04L 1/00* | (2006.01) | |
| *H04W 24/08* | (2009.01) | |
| *H04B 7/02* | (2006.01) | |
| *H04W 48/12* | (2009.01) | |
| *H04W 76/06* | (2009.01) | |
| *H04B 7/06* | (2006.01) | |

(56) References Cited

U.S. PATENT DOCUMENTS

| | | | |
|---|---|---|---|
| 2012/0213108 A1* | 8/2012 | Ji et al. ..................... 370/252 | |
| 2012/0213113 A1 | 8/2012 | Zhao et al. | |
| 2013/0044668 A1* | 2/2013 | Purnadi ............ H04W 36/0055 370/312 | |

OTHER PUBLICATIONS

ZTE; "Consideration on specification impact of CoMP"; 3GPP TSG RAN WG1 Meeting #66, R1-112259; Athens, Greece; Aug. 22-26, 2011 (5 pages).

Huawei, HiSilicon; "CSI-RS port selection for distributed antennas"; 3GPP TSG RAN WG1#65, R1-112052; Athens, Greece; Aug. 22-26, 2011 (4 pages).

Ericsson, ST-Ericsson; "Remaining details for CA based HetNet in Rel-10"; 3GPP TSG-RAN WG1 #65, R1-111323; Barcelona, Spain; May 9-13, 2011 (3 pages).

Intel Corporation; "CSI-RS configuration/reconfiguration in distributed RRH systems"; 3GPP TSG RAN WG1 Meeting #65, R1-111593; Barcelona, Spain; May 9-13, 2011 (3 pages).

3GPP TR 36.819 V11.1.0; "3rd Generation Partnership Project; Technical Specification Group Radio Access Network; Coordinated multi-point operation for LTE physical layer aspects; (Release 11)"; Dec. 2011 (69 pages).

Written Opinion mailed Nov. 6, 2012 in related PCT Application No. PCT/JP2012/075388 (3 pages).

Extended Eurpoean Search Report in counterpart European Patent Application No. 12838890.7 issued Apr. 9, 2015 (7 pages).

Office Action in counterpart European Patent Application No. 12 838 890.7 issued Feb. 4, 2016 (6 pages).

* cited by examiner

RRCConnectionReconfiguration message

```
-- ASN1START

RRCConnectionReconfiguration ::=    SEQUENCE {
rrc-TransactionIdentifier           RRC-TransactionIdentifier,
criticalExtensions                  CHOICE {
    c1                                  CHOICE{
        rrcConnectionReconfiguration-r8     RRCConnectionReconfiguration-r8-IEs,
        spare7 NULL,
        spare6 NULL, spare5 NULL, spare4 NULL,
        spare3 NULL, spare2 NULL, spare1 NULL
    },
    criticalExtensionsFuture            SEQUENCE {}
}
}

...
}

RRCConnectionReconfiguration-v1020-IEs ::= SEQUENCE {
sCellToReleaseList-r10          SCellToReleaseList-r10          OPTIONAL,    -- Need ON
sCellToAddModList-r10           SCellToAddModList-r10           OPTIONAL,    -- Need ON
nonCriticalExtension            RRCConnectionReconfiguration-v11xy-IEs    OPTIONAL
}

RRCConnectionReconfiguration-v11xy-IEs ::= SEQUENCE {
CompTpsToReleaseList-r11        CompTpToReleaseList-r11         OPTIONAL,    -- Need ON
CompTpsToAddModList-r11         CompTpToAddModList-r11          OPTIONAL,    -- Need ON
nonCriticalExtension            SEQUENCE {}                     OPTIONAL     -- Need OP
}

SCellToAddModList-r10 ::=       SEQUENCE (SIZE (1..maxSCell-r10)) OF SCellToAddMod-r10

SCellToAddMod-r10 ::=           SEQUENCE {
sCellIndex-r10                      SCellIndex-r10,
cellIdentification-r10              SEQUENCE {
    physCellId-r10                      PhysCellId,
    dl-CarrierFreq-r10                  ARFCN-ValueEUTRA
}                                                               OPTIONAL,    -- Cond SCellAdd
...
}

SCellToReleaseList-r10 ::=      SEQUENCE (SIZE (1..maxSCell-r10)) OF SCellIndex-r10

CompTpsToAddModList-r11 ::=     SEQUENCE (SIZE (1..maxCompTP-r11)) OF CompTPsToAddMod-r11  ⟵ A
                                                                                              B
CompTpsToAddMod-r11 ::= SEQUENCE {                                                           ⎫
cellIndex-r11                   INTEGER (1..maxCompTP),                                      ⎪
physCellId-r11                  PhysCellId,                                                  ⎬
radioResourceConfigCommonCompTp-r11   RadioResourceConfigCommonCompTp-r11 OPTIONAL,  -- Cond CompTpAdd   ⎪
radioResourceConfigDedicatedCompTp-r11 RadioResourceConfigDedicatedCompTp-r11 OPTIONAL,  -- Cond CompTpAdd2 ⎭
...
}

CompTpToReleaseList-r11 ::=     SEQUENCE (SIZE (1..maxCompTP-r11)) OF cellIndex-r11  ⟵ C SecurityConfigHO ::=            SEQUENCE {
handoverType                        CHOICE {
    intraLTE                            SEQUENCE {
        securityAlgorithmConfig             SecurityAlgorithmConfig         OPTIONAL,    -- Cond fullConfig
        keyChangeIndicator                  BOOLEAN,
        nextHopChainingCount                NextHopChainingCount
    },
    interRAT                            SEQUENCE {
        securityAlgorithmConfig             SecurityAlgorithmConfig,
        nas-SecurityParamToEUTRA            OCTET STRING (SIZE(6))
    }
},
...
}

-- ASN1STOP
```

FIG. 4

RadioResourceConfigCommon information element

```
-- ASN1START

RadioResourceConfigCommonSIB ::=    SEQUENCE {
    rach-ConfigCommon               RACH-ConfigCommon,
    bcch-Config                     BCCH-Config,
    pcch-Config                     PCCH-Config,
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    ul-CyclicPrefixLength           UL-CyclicPrefixLength,
    ...,
    [[ uplinkPowerControlCommon-v1020  UplinkPowerControlCommon-v1020   OPTIONAL    -- Need OR
    ]]
}

RadioResourceConfigCommon ::=       SEQUENCE {
    rach-ConfigCommon               RACH-ConfigCommon               OPTIONAL,   -- Need ON
    prach-Config                    PRACH-Config,
    pdsch-ConfigCommon              PDSCH-ConfigCommon              OPTIONAL,   -- Need ON
    pusch-ConfigCommon              PUSCH-ConfigCommon,
    phich-Config                    PHICH-Config                    OPTIONAL,   -- Need ON
    pucch-ConfigCommon              PUCCH-ConfigCommon              OPTIONAL,   -- Need ON
    soundingRS-UL-ConfigCommon      SoundingRS-UL-ConfigCommon      OPTIONAL,   -- Need ON
    uplinkPowerControlCommon        UplinkPowerControlCommon        OPTIONAL,   -- Need ON
    antennaInfoCommon               AntennaInfoCommon       OPTIONAL,   -- Need ON
    p-Max                           P-Max                           OPTIONAL,   -- Need OP
    tdd-Config                      TDD-Config                      OPTIONAL,   -- Cond TDD
    ul-CyclicPrefixLength           UL-CyclicPrefixLength,
    ...,
    [[ uplinkPowerControlCommon-v1020  UplinkPowerControlCommon-v1020   OPTIONAL    -- Need ON
    ]]
}

RadioResourceConfigCommonSCell-r10 ::=  SEQUENCE {
    ...
    }                                                               OPTIONAL,   -- Need OR
    ...
}

RadioResourceConfigCommonCompTp-r11::=  SEQUENCE {
    ...
}

BCCH-Config ::=                     SEQUENCE {
    modificationPeriodCoeff          ENUMERATED {n2, n4, n8, n16}
}

PCCH-Config ::=                     SEQUENCE {
    defaultPagingCycle              ENUMERATED {
                                        rf32, rf64, rf128, rf256},
    nB                              ENUMERATED {
                                        fourT, twoT, oneT, halfT, quarterT, oneEighthT,
                                        oneSixteenthT, oneThirtySecondT}
}

UL-CyclicPrefixLength ::=           ENUMERATED {len1, len2}

-- ASN1STOP
```

FIG. 5

*RadioResourceConfigDedicated* information element

```
-- ASN1START

RadioResourceConfigDedicated ::=     SEQUENCE {
    srb-ToAddModList                 SRB-ToAddModList         OPTIONAL,    -- Cond HO-Conn
    drb-ToAddModList                 DRB-ToAddModList         OPTIONAL,    -- Cond HO-toEUTRA
    drb-ToReleaseList                DRB-ToReleaseList        OPTIONAL,    -- Need ON
    mac-MainConfig                   CHOICE {
        explicitValue                    MAC-MainConfig,
        defaultValue                     NULL
    }                                OPTIONAL,                             -- Cond HO-toEUTRA2
    sps-Config                       SPS-Config               OPTIONAL,    -- Need ON
    physicalConfigDedicated          PhysicalConfigDedicated  OPTIONAL,    -- Need ON
    ...,
    [[  rlf-TimersAndConstants-r9    RLF-TimersAndConstants-r9   OPTIONAL    -- Need ON
    ]],
    [[  measSubframePatternPCell-r10 MeasSubframePatternPCell-r10   OPTIONAL    -- Need ON
    ]]
}

RadioResourceConfigDedicatedSCell-r10 ::=   SEQUENCE {
    -- UE specific configuration extensions applicable for an SCell
    physicalConfigDedicatedSCell-r10    PhysicalConfigDedicatedSCell-r10   OPTIONAL,   -- Need ON
    ...
}

RadioResourceConfigDedicatedCompTp-r11 ::=   SEQUENCE {
    -- UE specific configuration extensions applicable for a CoMP transmission point
    physicalConfigDedicatedCompTp-r11   PhysicalConfigDedicatedCompTp-r11   OPTIONAL,   -- Need ON
    ...
}

SRB-ToAddModList ::=                 SEQUENCE (SIZE (1..2)) OF SRB-ToAddMod

SRB-ToAddMod ::=    SEQUENCE {
    srb-Identity                     INTEGER (1..2),
    rlc-Config                       CHOICE {
        explicitValue                    RLC-Config,
        defaultValue                     NULL
    }                                OPTIONAL,                             -- Cond Setup
    logicalChannelConfig             CHOICE {
        explicitValue                    LogicalChannelConfig,
        defaultValue                     NULL
    }                                OPTIONAL,                             -- Cond Setup
    ...
}

DRB-ToAddModList ::=                 SEQUENCE (SIZE (1..maxDRB)) OF DRB-ToAddMod DRB-ToAddMod ::=     SEQUENCE {
    eps-BearerIdentity               INTEGER (0..15)          OPTIONAL,    -- Cond DRB-Setup
    drb-Identity                     DRB-Identity,
    pdcp-Config                      PDCP-Config              OPTIONAL,    -- Cond PDCP
    rlc-Config                       RLC-Config               OPTIONAL,    -- Cond Setup
    logicalChannelIdentity           INTEGER (3..10)          OPTIONAL,    -- Cond DRB-Setup
    logicalChannelConfig             LogicalChannelConfig     OPTIONAL,    -- Cond Setup
    ...
}

DRB-ToReleaseList ::=                SEQUENCE (SIZE (1..maxDRB)) OF DRB-Identity MeasSubframePatternPCell-r10 ::=     CHOICE {
    release                              NULL,
    setup                                MeasSubframePattern-r10
}

-- ASN1STOP
```

FIG. 6

*PhysicalConfigDedicated information element*

```
-- ASN1START

PhysicalConfigDedicated ::=      SEQUENCE {
    pdsch-ConfigDedicated          PDSCH-ConfigDedicated          OPTIONAL,      -- Need ON
    pucch-ConfigDedicated          PUCCH-ConfigDedicated          OPTIONAL,      -- Need ON
    pusch-ConfigDedicated          PUSCH-ConfigDedicated          OPTIONAL,      -- Need ON
    uplinkPowerControlDedicated    UplinkPowerControlDedicated    OPTIONAL,      -- Need ON
    tpc-PDCCH-ConfigPUCCH          TPC-PDCCH-Config               OPTIONAL,      -- Need ON
    tpc-PDCCH-ConfigPUSCH          TPC-PDCCH-Config               OPTIONAL,      -- Need ON
    cqi-ReportConfig               CQI-ReportConfig               OPTIONAL,      -- Cond CQI-r8
    soundingRS-UL-ConfigDedicated  SoundingRS-UL-ConfigDedicated  OPTIONAL,      -- Need ON
    antennaInfo                    CHOICE {
        explicitValue                  AntennaInfoDedicated,
        defaultValue                   NULL
    }       OPTIONAL,                                                            -- Cond AI-r8
    schedulingRequestConfig        SchedulingRequestConfig        OPTIONAL,      -- Need ON
    ...,
    [[ cqi-ReportConfig-v920           CQI-ReportConfig-v920          OPTIONAL,      -- Cond CQI-r8
       antennaInfo-v920                AntennaInfoDedicated-v920      OPTIONAL,      -- Cond AI-r8
    ]],
    [[ antennaInfo-r10                 CHOICE {
           explicitValue-r10               AntennaInfoDedicated-r10,
           defaultValue                    NULL
       }       OPTIONAL,                                                         -- Cond AI-r10
       antennaInfoUL-r10               AntennaInfoUL-r10              OPTIONAL,      -- Need ON
       cif-Presence-r10                BOOLEAN                        OPTIONAL,      -- Need ON
       cqi-ReportConfig-r10            CQI-ReportConfig-r10           OPTIONAL,      -- Cond CQI-r10
       csi-RS-Config-r10               CSI-RS-Config-r10              OPTIONAL,      -- Need ON
       pucch-ConfigDedicated-v1020     PUCCH-ConfigDedicated-v1020    OPTIONAL,      -- Need ON
       pusch-ConfigDedicated-v1020     PUSCH-ConfigDedicated-v1020    OPTIONAL,      -- Need ON
       schedulingRequestConfig-v1020   SchedulingRequestConfig-v1020  OPTIONAL,      -- Need ON
       soundingRS-UL-ConfigDedicated-v1020
                                       SoundingRS-UL-ConfigDedicated-v1020 OPTIONAL, -- Need ON
       soundingRS-UL-ConfigDedicatedAperiodic-r10
                                       SoundingRS-UL-ConfigDedicatedAperiodic-r10 OPTIONAL, -- Need ON
       uplinkPowerControlDedicated-v1020  UplinkPowerControlDedicated-v1020 OPTIONAL  -- Need ON
    ]]
}

PhysicalConfigDedicatedSCell-r10 ::=    SEQUENCE {
    -- DL configuration as well as configuration applicable for DL and UL
    nonUL-Configuration-r10        SEQUENCE {
        antennaInfo-r10                AntennaInfoDedicated-r10       OPTIONAL,      -- Need ON
        crossCarrierSchedulingConfig-r10  CrossCarrierSchedulingConfig-r10  OPTIONAL,   -- Need ON
        csi-RS-Config-r10              CSI-RS-Config-r10              OPTIONAL,      -- Need ON
        pdsch-ConfigDedicated-r10      PDSCH-ConfigDedicated          OPTIONAL       -- Need ON
    }                                                                 OPTIONAL,      -- Cond SCellAdd
    -- UL configuration
    ul-Configuration-r10           SEQUENCE {
        antennaInfoUL-r10              AntennaInfoUL-r10              OPTIONAL,      -- Need ON
        pusch-ConfigDedicatedSCell-r10 PUSCH-ConfigDedicatedSCell-r10 OPTIONAL,      -- Need ON
        uplinkPowerControlDedicatedSCell-r10  UplinkPowerControlDedicatedSCell-r10 OPTIONAL,   -- Need ON
        cqi-ReportConfigSCell-r10      CQI-ReportConfigSCell-r10      OPTIONAL,      -- Need ON
        soundingRS-UL-ConfigDedicated-r10  SoundingRS-UL-ConfigDedicated  OPTIONAL,  -- Need ON
        soundingRS-UL-ConfigDedicated-v1020
                                       SoundingRS-UL-ConfigDedicated-v1020 OPTIONAL, -- Need ON
        soundingRS-UL-ConfigDedicatedAperiodic-r10
                                       SoundingRS-UL-ConfigDedicatedAperiodic-r10 OPTIONAL -- Need ON
    }                                                                 OPTIONAL,      -- Cond CommonUL
    ...
}

PhysicalConfigDedicatedCompTp-r11 ::=   SEQUENCE {
    csi-RS-Config-r11              CSI-RS-Config-r11              OPTIONAL,      -- Need ON
    ...
}

-- ASN1STOP
```

*RRCConnectionReconfiguration message*

```
-- ASN1START

RRCConnectionReconfiguration ::=    SEQUENCE {
    rrc-TransactionIdentifier       RRC-TransactionIdentifier,
    criticalExtensions              CHOICE {
        c1                              CHOICE{
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReconfiguration-v1020-IEs ::= SEQUENCE {
    sCellToReleaseList-r10          SCellToReleaseList-r10      OPTIONAL,   -- Need ON
    sCellToAddModList-r10           SCellToAddModList-r10       OPTIONAL,   -- Need ON
    nonCriticalExtension            SEQUENCE {}                 OPTIONAL    -- Need OP
}

SCellToAddModList-r10 ::=      SEQUENCE (SIZE (1..maxSCell-r10)) OF SCellToAddMod-r10

SCellToAddMod-r10 ::=           SEQUENCE {
    sCellIndex-r10                  SCellIndex-r10,
    cellIdentification-r10          SEQUENCE {
        physCellId-r10                  PhysCellId,
        dl-CarrierFreq-r10              ARFCN-ValueEUTRA
    }                                                           OPTIONAL,   -- Cond SCellAdd
    radioResourceConfigCommonSCell-r10   RadioResourceConfigCommonSCell-r10  OPTIONAL,   -- Cond SCellAdd
    radioResourceConfigDedicatedSCell-r10 RadioResourceConfigDedicatedSCell-r10 OPTIONAL, -- Cond SCellAdd2
    ...,
    compIndicator                   BOOLEAN
}

SCellToReleaseList-r10 ::=      SEQUENCE (SIZE (1..maxSCell-r10)) OF SCellIndex-r10

SecurityConfigHO ::=            SEQUENCE {
    handoverType                    CHOICE {
        intraLTE                        SEQUENCE {
            securityAlgorithmConfig         SecurityAlgorithmConfig     OPTIONAL,   -- Cond fullConfig
            keyChangeIndicator              BOOLEAN,
            nextHopChainingCount            NextHopChainingCount
        },
        interRAT                        SEQUENCE {
            securityAlgorithmConfig         SecurityAlgorithmConfig,
            nas-SecurityParamToEUTRA        OCTET STRING (SIZE(6))
        }
    },
    ...
}

-- ASN1STOP
```

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

In the Long Term Evolution (LTE) scheme, research has been conducted to apply a coordinated multi-point (CoMP) transmission/reception process so as to improve throughput in a mobile station (UE) located in a cell edge.

Such a CoMP transmission/reception process is a process of controlling coordination of transmission/reception, scheduling, or beamforming of a shared data channel signal between a plurality of transmission/reception nodes (CoMP transmission points) which are geographically separated from each other, for example, a radio base station (eNB), a remote radio equipment (RRE), and a relay node (RN).

CITATION LIST

Non-Patent Literature

Non-Patent Literature 1: 3GPP TR36.819

SUMMARY OF INVENTION

However, the current LTE scheme has a problem that there is no regulation for the addition and change of CoMP transmission points performing such a CoMP transmission/reception process.

Accordingly, the present invention has been made in view of the above problems and is directed to provide a mobile communication method, a radio base station, and a mobile station, which are capable of appropriately performing the addition and change of CoMP transmission points performing a CoMP transmission/reception process.

According to a first feature of the present invention, there is provided a mobile communication method including: a step of notifying, by a radio base station, configuration information of a reference signal for a mobile station in a transmission point to the mobile station connected to a cell managed by the radio base station, when instructing an addition or change of the CoMP transmission point performing a coordinated multi-point transmission/reception process by a connection reconfiguration signal; a step of measuring, by the mobile station, a channel quality of the transmission point by using the reference signal for the mobile station in the transmission point, while performing the coordinated multi-point transmission/reception process; and a step of notifying, by the mobile station, the channel quality of the transmission point to the radio base station.

According to a second feature of the present invention, there is provided a radio base station including: a transmission unit configured to notify configuration information of a reference signal for a mobile station in a transmission point to the mobile station connected to a cell managed by the radio base station, when instructing an addition or change of the transmission point performing a coordinated multi-point transmission/reception process by a connection reconfiguration signal; and a reception unit configured to acquire a channel quality of the transmission point, which is measured using the reference signal for the mobile station in the transmission point, from the mobile station, while performing the coordinated multi-point transmission/reception process.

According to a third feature of the present invention, there is provided a mobile station including: a reception unit connected to a cell managed by a radio base station, and configured to receive configuration information of a reference signal for the mobile station in a transmission point when a coordinated multi-point transmission/reception process is performed and an addition or change of a transmission point performing the coordinated multi-point transmission/reception process is instructed by a connection reconfiguration signal from the radio base station; a processing unit configured to measure a channel quality of the transmission point by using the reference signal for the mobile station in the transmission point, while performing the coordinated multi-point transmission/reception process; and a transmission unit configured to notify the channel quality of the transmission point to the radio base station.

BRIEF DESCRIPTION OF DRAWINGS

FIG. 3 is a diagram illustrating an example of a format of "RRC Connection Reconfiguration" transmitted by a radio base station according to the first embodiment of the present invention.

FIG. 4 is a diagram illustrating an example of a format of a "RadioResourceConfigCommon" information element included in the "RRC Connection Reconfiguration" transmitted by the radio base station according to the first embodiment of the present invention.

FIG. 5 is a diagram illustrating an example of a format of a "RadioResourceConfigDedicated" information element included in the "RRC Connection Reconfiguration" transmitted by the radio base station according to the first embodiment of the present invention.

FIG. 6 is a diagram illustrating an example of a format of a "PhysicalConfigDedicated" information element included in the "RadioResourceConfigDedicated" information element included in the "RRC Connection Reconfiguration" transmitted by the radio base station according to the first embodiment of the present invention.

FIG. 9 is a diagram illustrating an example of a format of "RRC Connection Reconfiguration" transmitted by the radio base station according to a first modification of the present invention.

DESCRIPTION OF EMBODIMENTS

Mobile Communication System According to First Embodiment of the Present Invention A mobile communication system according to a first embodiment of the present invention will be described with reference to FIGS. 1 to 8. In the present embodiment, an LTE mobile communication system is described as an example of the mobile communication system according to the present embodiment, but the present invention can also be applied to mobile communication systems other than the LTE mobile communication system.

The mobile communication system according to the present embodiment is configured to be capable of performing a CoMP transmission/reception process, in particular, a downlink CoMP transmission/reception process.

In such a downlink CoMP transmission/reception process, "Joint Transmission (JT)", "Dynamic Cell Selection (DCS)", or "Coordinated Scheduling/Beamforming (CS/CB)" is included.

Herein, the "JT" is a process of transmitting a shared data channel signal to a mobile station UE from a plurality of cells, that is, from cells other than a serving cell.

Also, the "DCS" is a process of selecting one cell at a high speed, based on channel quality information (CQI), and transmitting a shared data channel signal to a mobile station UE from the selected cell.

Furthermore, the "CS/CB" is a process of coordinating scheduling or beamforming between a serving cell and neighboring cells.

Figure 1:
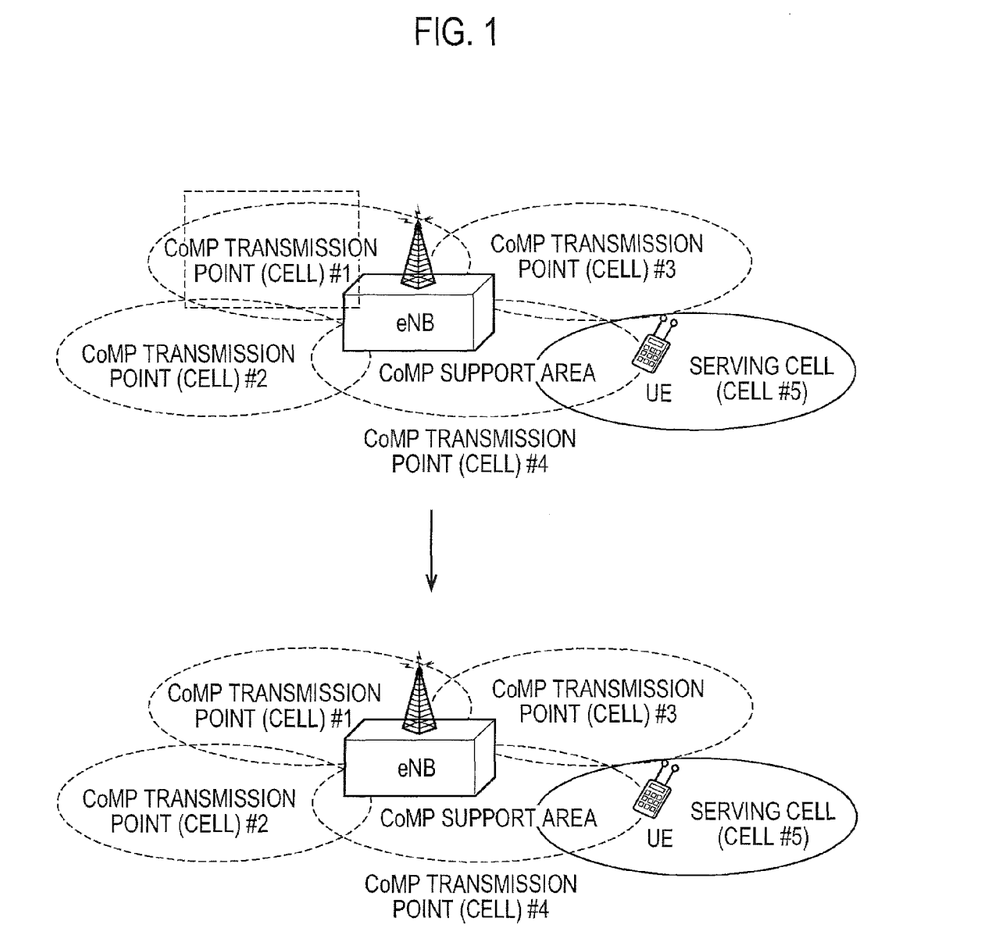
FIG. 1 is an overall configuration diagram of a mobile communication system according to a first embodiment of the present invention.

As illustrated in FIG. 1, the mobile communication system according to the present embodiment is configured such that a CoMP transmission/reception process can be provided in cells #1 to #5, that is, cells #1 to #5 become CoMP support areas.

Incidentally, the cells #1 to #5 may be managed by the same radio base station eNB, or may be managed by different radio base stations eNB.

Also, each of the cells #1 to #5 is configured to be capable of transmitting a Channel State Information Reference Signal (CSI-RS) in addition to a Cell specific Reference Signal (CRS).

Herein, the "CRS" is a reference signal that is defined in accordance with the LTE Rel-8/9 scheme, and is a reference signal that is commonly set to all mobile stations UE within each cell.

On the other hand, the CSI-RS is a reference signal that is defined in accordance with the LTE Rel-10 scheme, and is a reference signal that is separately set to each mobile station UE by using a Radio Resource Control (RRC) message.

The CSI-RS may be used for a quality measurement process of a CoMP transmission point (candidate targeted for a CoMP transmission/reception process), a serving cell, a neighboring cell (handover destination candidate), or the like, or may be used for a CQI measurement in a serving cell or a CoMP transmission point in which a CoMP transmission/reception process is performed.

Incidentally, the CSI-RS used for the above-described quality measurement process and the CSI-RS used for the above-described CQI measurement may be equal to each other or may be different from each other.

For example, based on requirement conditions for a measurement accuracy of the above-described quality measurement process and a measurement accuracy of the above-described CQI, it is possible to determine whether the CSI-RS used for the above-described quality measurement process and the CSI-RS used for the above-described CQI measurement are set to be equal to each other or different from each other.

Also, an arrangement density of the CSI-RS is configured to be lower than an arrangement density of the CRS.

Also, in a case where the CoMP transmission/reception process is provided in the cells #1 to #5, it may be configured such that the same Physical Cell ID (PCI) is used in the cells (CoMP transmission points) #1 to #5, or separate PCIs are used in the cells (CoMP transmission points) #1 to #5.

In the mobile communication system according to the present embodiment, it is assumed that the mobile station UE is connected to the cell #5 managed by the radio base station eNB, that is, the cell #5 is a serving cell of the mobile station UE.

Also, in the mobile communication system according to the present embodiment, it is assumed that one radio base station eNB or a plurality of radio base stations eNB provides the mobile station UE with the CoMP transmission/reception process by the cells #1 to #5.

Figure 2:
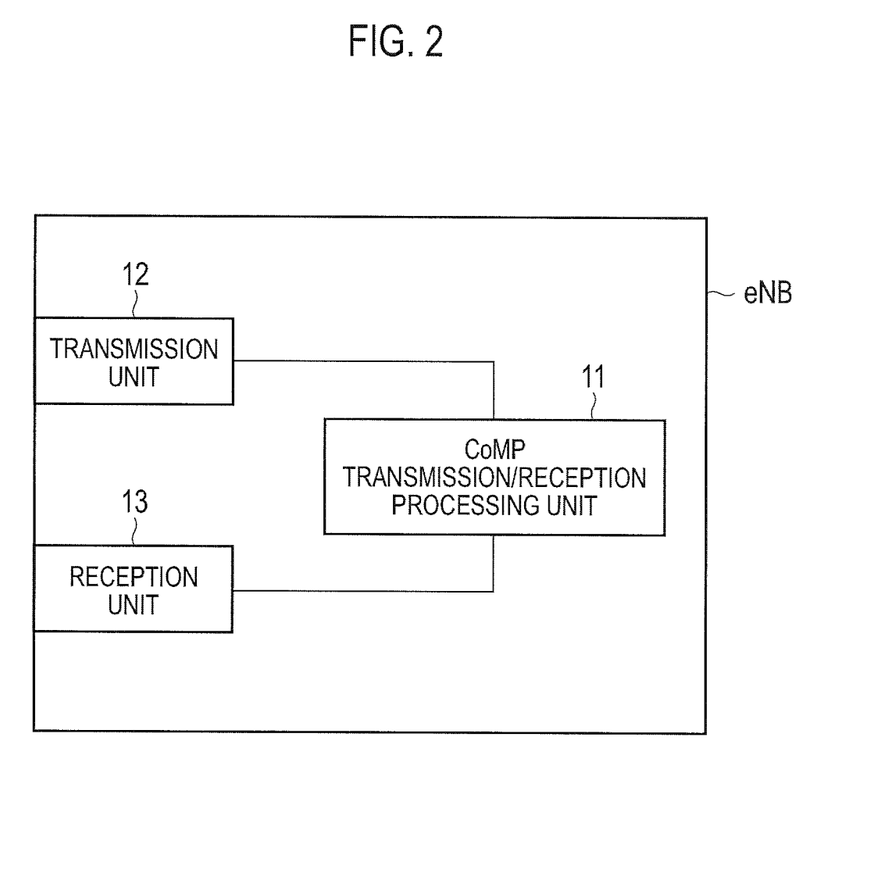
FIG. 2 is a functional block diagram of a radio base station according to the first embodiment of the present invention.

As illustrated in FIG. 2, the radio base station eNB includes a CoMP transmission/reception processing unit 11, a transmission unit 12, and a reception unit 13.

The CoMP transmission/reception processing unit 11 is configured to perform a process necessary for providing the mobile station UE with the CoMP transmission/reception process (for example, the above-described "JT", "DCS", "CS/CB", or the like).

The transmission unit 12 is configured to transmit various signals to the mobile station UE connected to the cell #5 or the like which is managed by the radio base station eNB.

For example, the transmission unit 12 is configured to notify configuration information of the CSI-RS of the CoMP transmission point to the mobile station UE when instructing the addition or change of the CoMP transmission point performing the CoMP transmission/reception process by "RRC Connection Reconfiguration".

FIG. 3 illustrates an example of a format of the "RRC Connection Reconfiguration".

In the "RRC Connection Reconfiguration" illustrated in FIG. 3, "physCellId-r11" of "compTPsToAddModList-r11" is an information element that notifies identification information of the CoMP transmission point to be added as the CoMP transmission point performing the CoMP transmission/reception process, or notifies identification information of the CoMP transmission point of which the content is to be changed among the CoMP transmission points performing the CoMP transmission/reception process (see the above-described A and B).

On the other hand, in the "RRC Connection Reconfiguration" illustrated in FIG. 3, "compTPsToRemoveList-r11" is an information element that notifies the CoMP transmission point to be removed from the CoMP transmission point performing the CoMP transmission/reception process (see the above-described C).

Incidentally, the "radioResourceConfigCommonCompTp-r11" of the "compTPsToAddModList-r11" of the "RRC Connection Reconfiguration" illustrated in FIG. 3 is set in "RadioResourceConfigCommon" illustrated in FIG. 4.

Also, "radioResourceConfigDedicatedCompTp-r11" of the "compTPsToAddModList-r11" of the "RRC Connection Reconfiguration" illustrated in FIG. 3 is set in "RadioResourceConfigDedicated" illustrated in FIG. 5.

Furthermore, "physicalConfigDedidatedCompTp-r11" of the "RadioResourceConfigDedicated" illustrated in FIG. 5 is set in "PhysicalConfigDedicated" illustrated in FIG. 6.

Herein, "csi-RS-Config-r11" of the "PhysicalConfigDedicated" illustrated in FIG. 6 is an information element that notifies configuration information of CSI-RS of the CoMP transmission point to be added as the CoMP transmission point performing the CoMP transmission/reception process, or notifies configuration information of CSI-RS to be changed in the CoMP transmission point performing the CoMP transmission/reception process.

The reception unit 13 is configured to receive various signals from the mobile station UE.

For example, the reception unit 13 is configured to acquire the CQI of the CoMP transmission point, which is measured using the CSI-RS of the CoMP transmission point, from the mobile station UE while the CoMP transmission/reception process is being performed.

Figure 7:
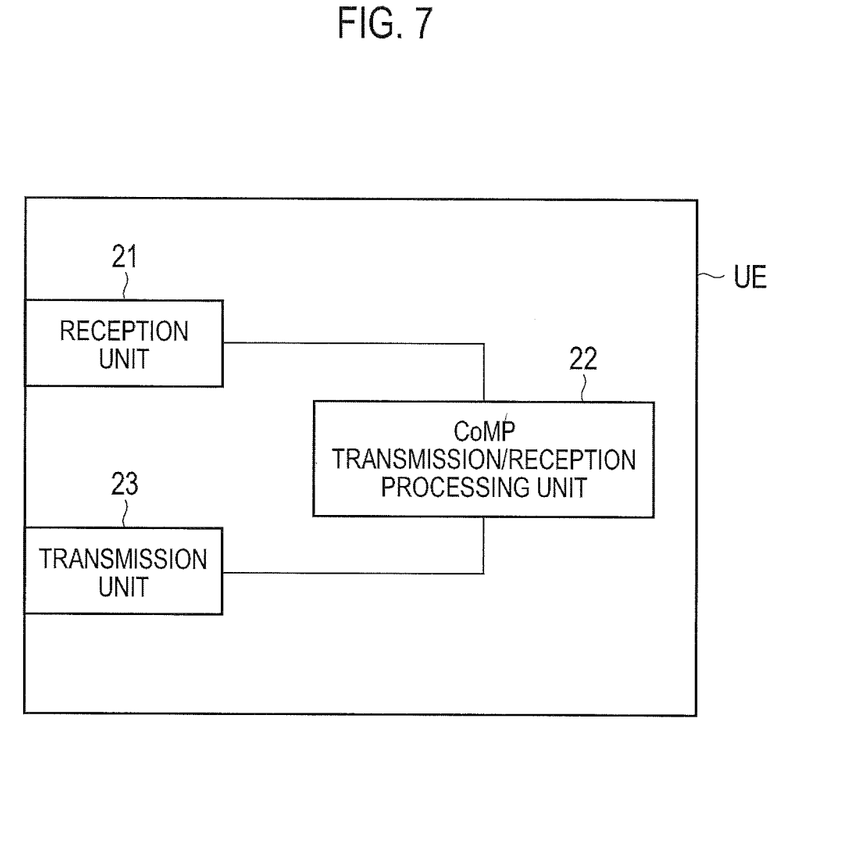
FIG. 7 is a functional block diagram of a mobile station according to the first embodiment of the present invention.

As illustrated in FIG. 7, the mobile station UE includes a reception unit 21, a CoMP transmission/reception processing unit 22, and a transmission unit 23.

The reception unit 21 is configured to receive various signals from the radio base station eNB managing the serving cell (cell #5).

For example, the reception unit 21 is connected to the cell #5 managed by the radio base station eNB and is configured to receive configuration information of CSI-RS of the CoMP transmission point when the CoMP transmission/reception process is performed and the addition or change of the CoMP transmission point performing the CoMP transmission/reception process is instructed by the "RRC Connection Reconfiguration" from the radio base station eNB.

In such a case, specifically, the reception unit 21 is configured to receive configuration information of the CSI-RS of the CoMP transmission point through the "csi-RS-Config-r11" of the "PhysicalConfigDedicated" illustrated in FIG. 6.

The CoMP transmission/reception processing unit 22 is configured to perform a process necessary for performing the CoMP transmission/reception process (for example, the above-described "JT", "DCS", "CS/CB", or the like).

For example, the CoMP transmission/reception processing unit 22 is configured to measure the CQI of the CoMP transmission point by using the CSI-RS of the CoMP transmission point performing the CoMP transmission/reception process.

The transmission unit 23 is configured to transmit various signals to the radio base station eNB.

For example, the transmission unit 23 is configured to notify the CQI of the CoMP transmission point, which is measured by the CoMP transmission/reception processing unit 22, to the radio base station eNB.

Hereinafter, the operation of the mobile communication system according to the present embodiment will be described with reference to FIG. 8.

Figure 8:
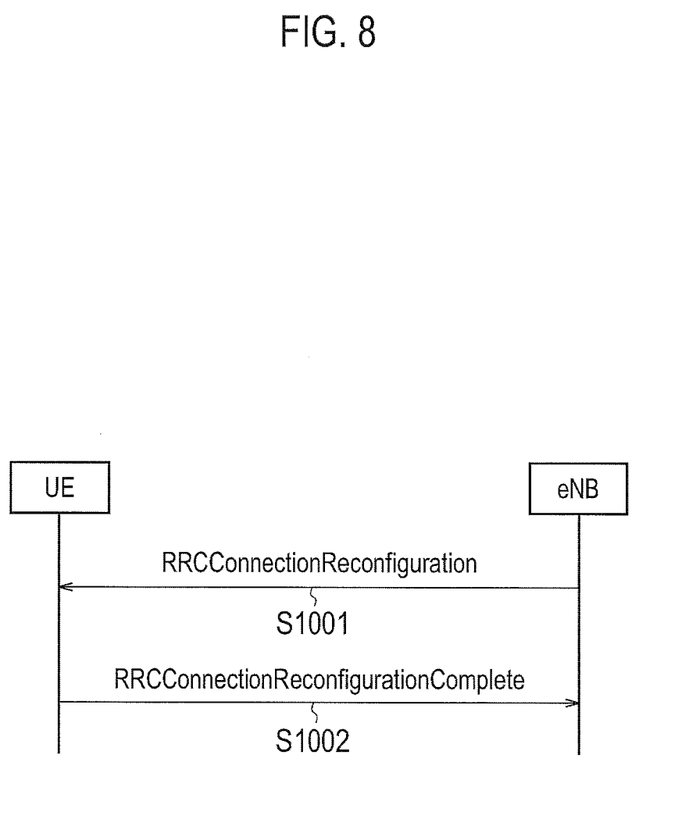
FIG. 8 is a sequence diagram describing an operation of the mobile communication system according to the first embodiment of the present invention.

As illustrated in FIG. 8, in step S1001, the radio base station eNB instructs the start of the CoMP transmission/reception process in the cells #1 to #5 by transmitting the "RRC Connection Reconfiguration" to the mobile station UE connected to the cell #5 managed by the radio base station eNB as the serving cell In step S1002, the mobile station UE starts the CoMP transmission/reception process in the cells #1 to #5 in response to the "RRC Connection Reconfiguration", and transmits "RRC Connection Reconfiguration Complete" to the radio base station eNB.

According to the mobile communication system of the present embodiment, the radio base station eNB can notify the configuration information of the CSI-RS of the CoMP transmission point when adding and changing the CoMP transmission point that performs the CoMP transmission/reception process by transmitting the "RRC Connection Reconfiguration" including the above-described "csi-RS-Config-r11" to the mobile station UE.

(First Modification)

Hereinafter, a mobile communication system according to a first modification of the present invention will be described with reference to FIG. 9, focusing on a difference from the above-described mobile communication system according to the first embodiment.

As illustrated in FIG. 9, the mobile communication system according to the first modification is configured such that the radio base station eNB notifies configuration information of the CSI-RS of the CoMP transmission point to the mobile station UE when performing the addition and change of the CoMP transmission point that performs the CoMP transmission/reception process by utilizing the information element used when performing the addition and change of Scell of carrier aggregation in the "RRC Connection Reconfiguration".

Herein, as illustrated in FIG. 9, "compIndicator" is provided in the "RRC Connection Reconfiguration" so as to indicate the information element for performing the addition and change of the CoMP transmission point that performs the CoMP transmission/reception process.

The features of the present embodiment described above may also be expressed as follows.

According to a first feature of the present embodiment, there is provided a mobile communication method including: a step of notifying, by a radio base station eNB, configuration information of CSI-RS (reference signal for a mobile station) in a CoMP transmission point to the mobile station UE connected to a cell #5 managed by the radio base station eNB, when instructing an addition or change of the CoMP transmission point performing a CoMP (coordinated multi-point) transmission/reception process by "RRC Connection Reconfiguration (connection reconfiguration signal) "; a step of measuring, by the mobile station UE, a CQI (channel quality) of the CoMP transmission point by using the CSI-RS of the CoMP transmission point, while performing the CoMP transmission/reception process; and a step of notifying, by the mobile station UE, the CQI of the CoMP transmission point to the radio base station eNB.

According to a second feature of the present invention, there is provided a radio base station eNB including: a transmission unit 12 configured to notify configuration information of CSI-RS of a CoMP transmission point to a mobile station UE connected to a cell #5 managed by the radio base station eNB, when instructing an addition or change of the CoMP transmission point performing a CoMP transmission/reception process by "RRC Connection Reconfiguration"; and a reception unit 13 configured to acquire a CQI of the CoMP transmission point, which is measured using the CSI-RS of the CoMP transmission point, from the mobile station UE, while performing the CoMP transmission/reception process.

According to a third feature of the present invention, there is provided a mobile station UE including: a reception unit 21 connected to a cell #5 managed by a radio base station eNB, and configured to receive configuration information of CSI-RS of a CoMP transmission point when a CoMP transmission/reception process is performed and an addition or change of a CoMP transmission point performing the CoMP transmission/reception process is instructed by "RRC Connection Reconfiguration" from the radio base station eNB; a CoMP transmission/reception processing unit 22 configured to measure a CQI of the CoMP transmission point by using the CSI-RS of the CoMP transmission point, while performing the CoMP transmission/reception process; and a transmission unit 23 configured to notify the CQI of the CoMP transmission point to the radio base station eNB.

Incidentally, the operation of the radio base station eNB or the mobile station UE described above may be implemented by hardware, may be implemented by a software module that is executed by a processor, or may be implemented by a combination of the hardware and the software module.

The software module may be provided in any type of recording medium, such as a Random Access Memory (RAM), a flash memory, a Read Only Memory (ROM), an Erasable Programmable ROM (EPROM), an Electronically Erasable and Programmable ROM (EEPROM), a register, a hard disk, a removable disk, or a CD-ROM.

Such a storage medium is connected to the processor so that the processor can read/write information from/to the storage medium. Also, such a storage medium may be integrated into the processor. Furthermore, the storage medium and the processor may be provided inside an ASIC. The ASIC may be provided in the radio base station eNB or the mobile station UE. Moreover, the storage medium and the processor may be provided in radio base station eNB or the mobile station UE as discrete components.

While the present invention has been described in detail with reference to the above-described embodiments, it is apparent to those skilled in the art that the present invention is not limited to the embodiments described in this specification. Furthermore, various changes and modifications can be made without departing from the spirit and scope of the invention as defined by the appended claims. Therefore, the descriptions of the present specification are intended for illustrative purposes and have no restrictive meaning for the present invention.

This application is based upon and claims the benefit of priority to Japanese Patent Application No. 2011-219652, filed on Oct. 3, 2011, the entire contents of which are incorporated herein by reference.

INDUSTRIAL APPLICABILITY

As described above, the present invention can provide a mobile communication method, a radio base station, and a mobile station, which are capable of appropriately performing the addition and change of CoMP transmission points performing a CoMP transmission/reception process.

REFERENCE SIGNS LIST eNB Radio base station
UE Mobile station
11, 22 CoMP transmission/reception processing unit
12, 23 Transmission unit
13, 21 Reception unit

The invention claimed is:
1. A mobile communication method comprising:
a step of notifying, by a radio base station, configuration information of a reference signal for a mobile station in a transmission point to the mobile station connected to a cell managed by the radio base station, when instructing an addition or change of the transmission point performing a coordinated multi-point transmission/reception process by an RRCConnectionReconfiguration including radioResourceConfigDedicated therein,
wherein an information element that notifies the configuration information of the reference signal for the mobile station in the transmission point, is set in the radioResourceConfigDedicated;
a step of measuring, by the mobile station, a channel quality of the transmission point by using the reference signal for the mobile station in the transmission point, while performing the coordinated multi-point transmission/reception process; and
a step of notifying, by the mobile station, the channel quality of the transmission point to the radio base station.

2. A radio base station comprising:
a transmission unit configured to notify configuration information of a reference signal for a mobile station in a transmission point to the mobile station connected to a cell managed by the radio base station, when instructing an addition or change of the transmission point performing a coordinated multi-point transmission/reception process by an RRCConnectionReconfiguration including radioResourceConfigDedicated therein,
wherein an information element that notifies the configuration information of the reference signal for the mobile station in the transmission point, is set in the radioResourceConfigDedicated; and
a reception unit configured to acquire a channel quality of the transmission point, which is measured using the reference signal for the mobile station in the transmission point, from the mobile station, while performing the coordinated multi-point transmission/reception process.

3. A mobile station comprising:
a reception unit connected to a cell managed by a radio base station, and configured to receive configuration information of a reference signal for the mobile station in a transmission point when a coordinated multi-point transmission/reception process is performed and an addition or change of a transmission point performing the coordinated multi-point transmission/reception process is instructed from the radio base station by an RRCConnectionReconfiguration including radioResourceConfigDedicated therein,
wherein an information element that notifies the configuration information of the reference signal for the mobile station in the transmission point, is set in the radioResourceConfigDedicated;
a processing unit configured to measure a channel quality of the transmission point by using the reference signal for the mobile station in the transmission point, while performing the coordinated multi-point transmission/reception process; and
a transmission unit configured to notify the channel quality of the transmission point to the radio base station.

* * * * *